United States Patent [19]

Nguyen

[11] Patent Number: 5,404,437
[45] Date of Patent: Apr. 4, 1995

[54] MIXING OF COMPUTER GRAPHICS AND ANIMATION SEQUENCES

[75] Inventor: Julien T. Nguyen, Redwood City, Calif.

[73] Assignee: Sigma Designs, Inc., Fremont, Calif.

[21] Appl. No.: 975,910

[22] Filed: Nov. 10, 1992

[51] Int. Cl.6 ............................................. G06F 15/62
[52] U.S. Cl. ................................. 395/152; 395/153; 345/122
[58] Field of Search ..................... 395/152, 153, 154; 340/725, 734; 345/115, 116, 122, 196; 348/584, 589, 598, 600

[56] References Cited

U.S. PATENT DOCUMENTS

| | | | |
|---|---|---|---|
| 3,908,080 | 9/1975 | Broadbent | 358/343 |
| 4,498,098 | 2/1985 | Stell | 358/22 |
| 4,523,227 | 6/1985 | Hust | 358/105 |
| 4,580,165 | 4/1986 | Patton et al. | 358/148 |
| 4,626,837 | 12/1986 | Priestly | 348/584 |
| 4,680,622 | 7/1987 | Barnes et al. | 358/22 |
| 4,891,631 | 1/1990 | Fredlund et al. | 340/701 |
| 4,907,086 | 3/1990 | Truong | 358/183 |
| 4,951,229 | 8/1990 | DiNicola et al. | 340/725 |
| 4,994,912 | 2/1991 | Lumelsky et al. | 358/140 |
| 5,097,257 | 3/1992 | Clough et al. | 345/196 |
| 5,099,331 | 3/1992 | Truong | 340/734 |
| 5,138,307 | 8/1992 | Tatsumi | 340/734 |
| 5,185,665 | 2/1993 | Okura et al. | 348/589 |
| 5,218,431 | 6/1993 | Gleicher et al. | 358/13 |
| 5,243,447 | 9/1993 | Bodenkamp et al. | 345/116 |

*Primary Examiner*—Heather R. Herndon
*Assistant Examiner*—N. Kenneth Burraston
*Attorney, Agent, or Firm*—D'Alessandro, Frazzini & Ritchie

[57] ABSTRACT

Apparatus and a method is disclosed for mixing animation sequences with computer graphics information for presentation on a computer display screen. The animation sequences may be stored in compressed format in a standard storage medium. An animation sequence generator retrieves these compressed animation sequences, decompresses them into pixel information, and sends them to a single line store for synchronization with the computer graphics pixel information. Pixels from the animation sequences and from the computer graphics generator are mixed, windowed and overlaid in a digital mixer. The output of the digital mixer is sent to a visual display system such as a video digital-to-analog converter driving a computer display monitor.

18 Claims, 9 Drawing Sheets

MIXING OF COMPUTER GRAPHICS AND ANIMATION SEQUENCES

BACKGROUND OF THE INVENTION

1. Field Of The Invention

The present invention relates to the field of computer animation/graphics display systems. More particularly, the present invention relates to apparatus and methods for mixing animation sequences stored in compressed form in a standard digital storage system, and computer graphics generated by the computer employing a single line store to synchronize the decompressed animation sequences to the computer graphics.

2. The Prior Art

Many new multimedia applications require the presentation of animation sequences together with computer graphics on the same computer monitor. A dedicated animation sequence generator is used to decode the animation sequences stored in compressed form. Combining images delivered by the computer graphics generator and the animation sequence generator presents several problems.

The first problem relates to synchronization. The computer graphics generator outputs pixels at a certain pixel frequency (25 to 50 MHz), line frequency (35 kHz typically) and frame frequency (in excess of 70 Hz). In contrast, the animation sequence generator outputs pixels at typically a maximum frequency of 20 MHz, and a frame frequency of 25 or 30 Hz (a frame being typically 640×480 pixels). Before the computer graphics and the animation sequences can be combined, they have to be synchronized. Most of the time, the animation sequences have to be synchronized to the computer graphics. This is usually done by employing one or several frame stores, each frame store being implemented with dual port dynamic RAM (Video RAMs or VRAMs). This implementation results in a high product cost, since at least one megabyte of expensive VRAMs have to be used.

It is desirable for the animation images to occupy only part of the computer screen. Therefore, the animation images have to be resized dynamically in real time. This resizing usually requires one frame store, with its addition to the cost of the product. Moreover, resampling must be followed by filtering if a good quality animation image is to be displayed. Temporal filtering in particular requires simultaneous access to corresponding lines from consecutive frames. This usually requires n frame stores, if an n-order temporal filter is to be implemented. This results in a geometric increase of the memory requirement, and the cost of the product, as more sophisticated temporal filtering is implemented.

In some applications, it is desirable to simultaneously present on the computer screen several animation sequences mixed with the computer graphics. This usually requires the use of several animation sequence generators, thereby increasing considerably the cost of the product and the complexity of the hardware design.

BRIEF DESCRIPTION OF THE INVENTION

According to the present invention an apparatus for mixing animation sequences and computer graphics for display on a computer terminal display or the like includes a storage medium for storing information representing animation sequences. According to a presently preferred embodiment of the invention, animation sequences are stored in compressed format in a standard storage medium, such as a hard disk drive, a CD-ROM player, a readwrite optical drive, a server storage medium, etc. An animation sequence generator decompresses and stores information representing the pixel data for a predetermined number of frames of the animation sequence. A single line store is used to synchronize the animation sequence pixel data with the computer graphics pixel data. The mixed and synchronized pixel data is then presented to the display driver circuitry which drives the display.

The pixel data in the line store may be resampled and horizontally filtered, and can be temporally filtered by using n line stores if a n-order filter is desired. Finally, multiple animation sequences can be simultaneously delivered by the same animation sequence generator, by either downsizing each sequence or playing each sequence at lower frame rates.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
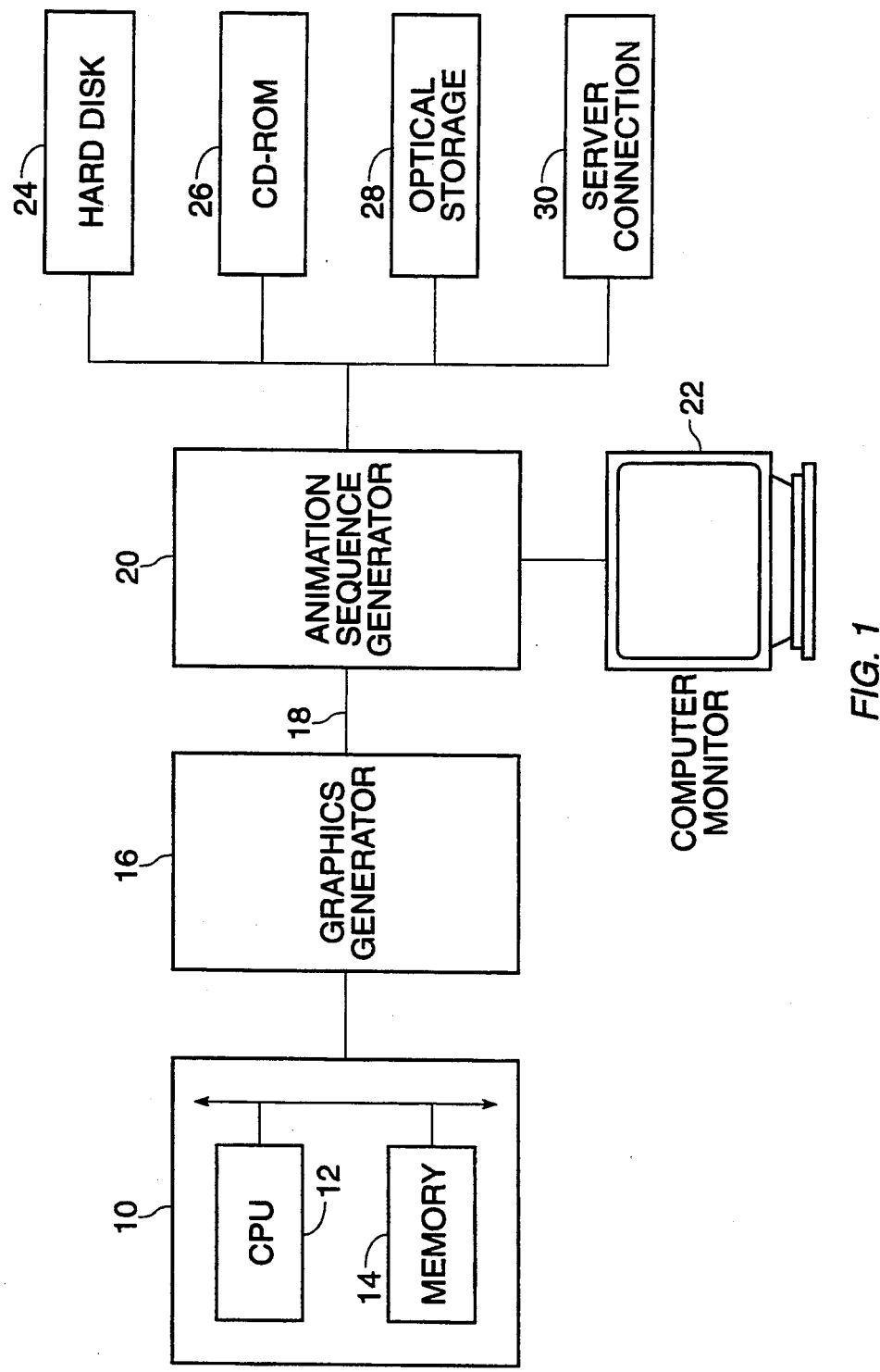
FIG. 1 is a block diagram illustrating an animation sequence generator and overlay electronics according to the present invention connected in combination with a computer system.

Referring first to FIG. 1, a block diagram is shown of a computer system incorporating an animation sequence generator according to the present invention. As shown in FIG. 1, a general computer 10, such as the IBM PC-AT or compatible machines, includes a central processing unit (CPU) 12, and some system random access memory (RAM) 14. The CPU is also connected to a computer graphics generator 16, such as a VGA or SVGA graphics generator, as is known in the art. The computer graphics generator has a digital output bus 18 which delivers 8 bits of pixel information (thereby enabling the presentation of at most 256 colors), the horizontal and vertical synchronization signals, and the pixel clock.

According to the present invention, the output 18 is connected to animation sequence generator and overlay electronics 20, which contains the electronics necessary to perform the mixing of the animation sequence pixels and the computer graphics pixels and deliver the composite signal to the computer display. Given the modular nature of personal computers, disclosure of the present invention will be made using an illustrative embodiment comprising a single circuit card including the electronics necessary to perform the mixing of the animation sequence pixels and the computer graphics pixels and generate the composite signal used to drive the computer display 22, but those of ordinary skill in the art will recognize that the circuit board distribution of the circuit elements disclosed herein is somewhat arbitrary and is largely a matter of design choice.

The animation sequences for use by animation sequence generator 20 may be stored in compressed form in any one of a number of different storage media, such as hard disk drive 24, a CD-ROM drive 26, a read/write optical storage 28, or a server through the server connection 30. Those of ordinary skill in the art will recognize that one or more of these devices may be easily interfaced with the other elements of the invention.

Figure 2:
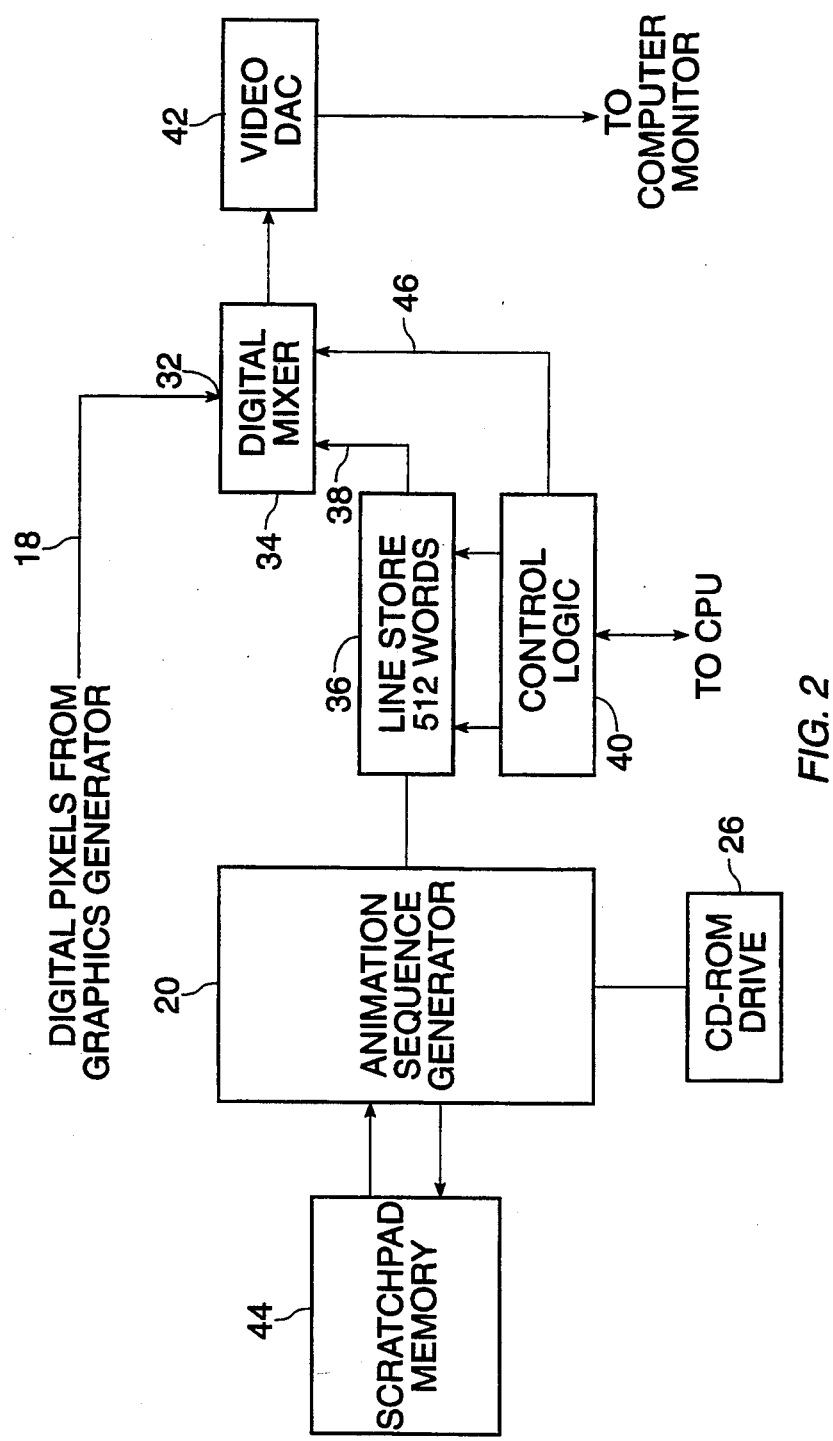
FIG. 2 is a block diagram of the animation sequence generator and overlay electronics of FIG. 1 according to a presently preferred embodiment of the invention.

More specifically, and as may be seen from an examination of FIG. 2, a block diagram of the animation sequence generator 20 of FIG. 1, the digital output bus 18 from the computer graphics generator 16 is connected to input 32 of digital mixer 34. Digital mixer 34 may comprise a digital multiplexer having its select input controlled by a chromakey gating circuit, as will be more fully disclosed with reference to FIG. 4, and is used to mix and overlay pixels from the computer graphics generator 16 and the animation sequence generator 20. Pixels from the animation sequence generator 20 are buffered by the single line store 36. The output of the line store 36 is connected to input 38 of the digital mixer 34 so as to deliver animation-sequence pixels to the digital mixer 34 one line at a time. Control logic 40 operates under the control of CPU 12 in computer 10 to direct the operation of line store 36 and digital mixer 34, as will be further discussed herein.

The output of digital mixer 34 is connected to a video digital-to-analog converter (DAC) 42. Video DAC 42 converts the digital pixel information from the digital mixer 34 to analog signals, which are then fed to the computer monitor 22. The design and use of video DAC circuits are both well known in the art.

Finally scratchpad memory 44 is associated with animation sequence generator 20. Scratchpad memory 44 is used to store, among other things, animation sequence frames in compressed data form.

As an example, the system of FIG. 2 is shown coupled to CD ROM Drive 26, which supplies compressed data representing one or more animation sequences to animation sequence generator 20. They are buffered in the scratchpad memory 44. The animation sequence generator 20 reads blocks of compressed pixels from a particular frame from the scratchpad memory 44, decompresses these blocks into individual digital pixels. The decompressed sequence pixels are sent to line store 36.

In the implementation depicted in FIG. 2, line store 36 has a capacity of 512 words. Thus, in this embodiment, the maximum number of animation sequence pixels is then limited to 512 pixels per line. Those of ordinary skill in the art will recognize, however, that these pixels can be duplicated before they are sent to the digital mixer 34, in order that the desired number of pixels per line are delivered. For example, if 640 pixels of animation are to be displayed per line, and the animation sequence generator 20 sends only 320 pixels per line to the line store 36, the control logic 40 can force the line store to read the same pixel out of the line store twice.

Conversely, the decompressed pixels sent by the animation sequence generator 20 can also be decimated by the control logic 40. For example, if the animation sequence generator 20 delivers 320 pixels per line, and only 240 animation pixels are to displayed per line, the control logic then enables the writing of only 3 out of every 4 decompressed pixels, to decimate the pixel line count from 320 animation pixels to 240 animation pixels. The control logic 40 also selects the operation for the digital mixer 34 through control signals asserted on control bus 46. The output of digital mixer 34 is sent to the video DAC 42 which generates analog R, G, B signals to present to computer monitor 22.

Figure 3:
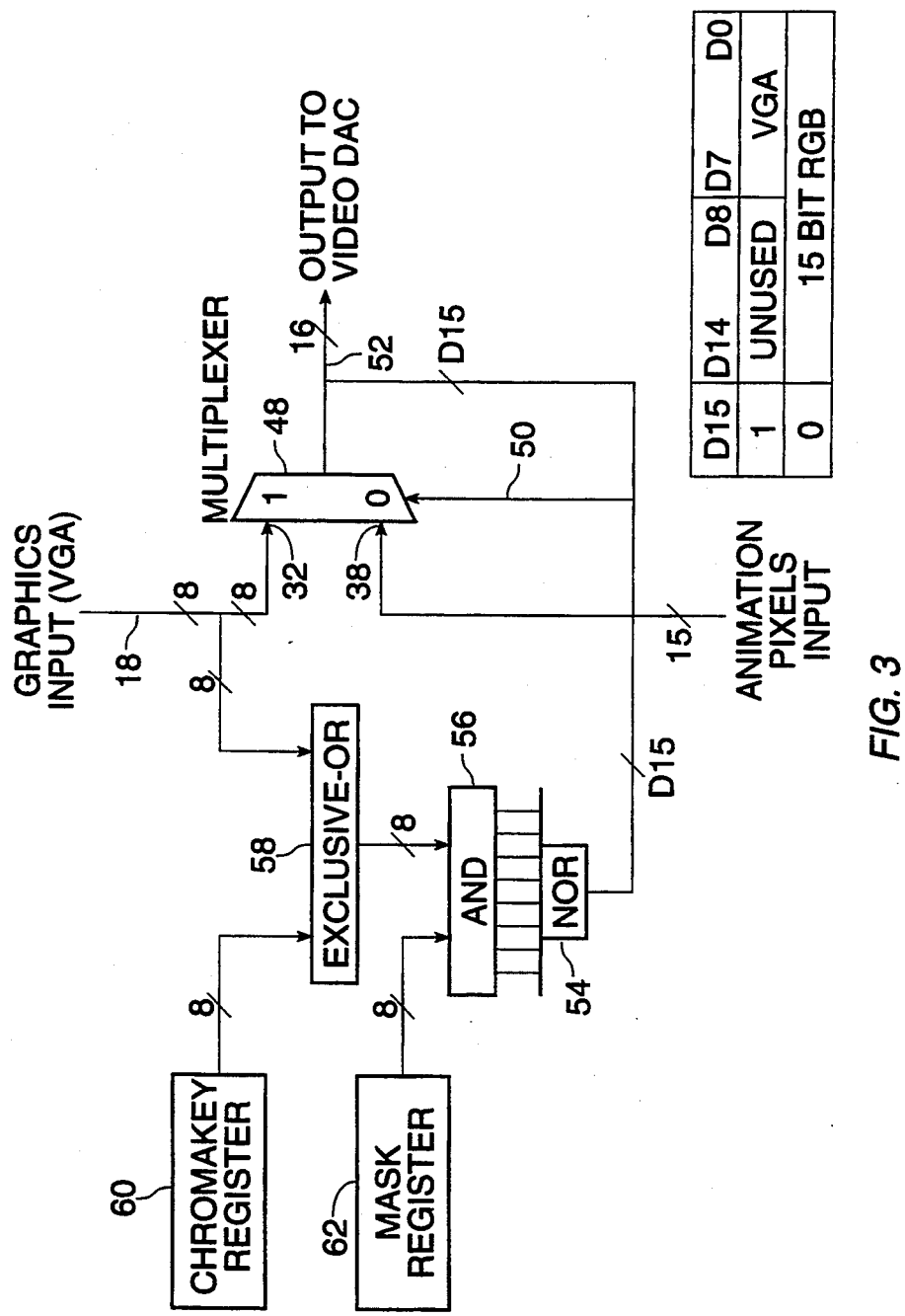
FIG. 3 is a block diagram of a digital mixer suitable for use in the present invention.

Referring now to FIG. 3, a digital mixer 34 suitable for use in the present invention is shown in block diagram form. Multiplexer 48 has a first data input 32 connected to output bus 18 from graphics generator 16 and a second data input 38 connected to the output bus of line store 36. A control input 50 selects which of inputs 32 and 38 is passed to output 52, which forms the output of digital mixer 34.

The selection of the one of inputs 32 and 38 to pass to output 52 of multiplexer 48 is controlled by 8-input NOR gate 54, byte-wide AND gate 56, byte-wide XOR gate 58, Chromakey register 60 and Mask register 62. Chromakey register 60 is loaded by control logic 40 with a color value representing the color of a region which defines the portion of the video frame area to be occupied by the animation sequence. Typically, such a region is rectangular in shape (although it may be otherwise) and is defined by computer 10 as is well known in the art. The byte defining this color is compared with the pixel byte stream from output bus 18 of graphics generator 16 by byte-wide XOR gate 58. The individual bits of the output of the XOR gate 58 are compared with the value stored in mask register 62 in AND gate 56. The outputs of AND gate 56 are presented to 8-input NOR gate 54. If the value 00(Hex) is stored in mask register 56, the output of NOR gate 54 will be a logic one and the graphics generator pixels will be passed to the output of multiplexer 48. If, however, any value other than 00(Hex) is stored in chromakey register 60 and any value other than 00(Hex) is stored in Mask register 62, the output of NOR gate 54 will be a logic zero and the animation sequence pixels will be passed to the output of multiplexer 48.

According to the present invention, the animation sequence images are synchronized to the computer graphics images before the digital mixer, by using a single line store 36, instead of one or multiple complete frame stores as is customary. There are three requirements for synchronization. First, the animation pixel frequency must be equal to the computer graphics pixel frequency Fpixel. In addition, the animation pixel horizontal frequency must be equal to the computer graphics horizontal frequency Fh. Finally, the animation pixel vertical frequency must be equal to the computer graphics vertical frequency Fv.

Given Pa, the number of animation pixels to be displayed per horizontal line, the pixel frequency output from the animation sequence generator 20 Fa are written into the line store:

Fa=Pa*Fh

The pixels are read out of the line store at frequency Fpixel which is the computer graphics pixel frequency. In general Fa is much lower than Fpixel. This insures that the animation pixel frequency is equal to the computer graphics pixel frequency Fpixel. Since a complete line of animation pixels is written and read to and from the line store at frequency Fh, the animation pixel horizontal frequency is equal to the computer graphics horizontal frequency Fh.. Thus, the first two requirements are satisfied.

Animation sequences are generated at typically 24, 25 or 30 different frames per second, whereas the computer graphics frame rate varies from 60 frames per second to 76 frames per second. To synchronize the two different frame rates, the animation sequence generator 20 delivers the same frame multiple times so that the total number of animation frames per second is equal to the computer graphics frame rate. For example, to convert from 24 animation frames per second to 60 computer graphics frames per second, the 24 animation frames may be repeated in some manner, i.e., by repeating each odd numbered frame twice and each even numbered frame three times: A,A,B,B,B,C,C,D,D,-D,E,E,F,F,F, G,G,H,H,H,I,I,J,J,J,K,K,L,L,L,M,M,N,N,-N,O,O,P,P,P,Q,Q,R,R,R,S,S,T,T,T,U,U,V,V,V, W,W,X,X,X, for a total of sixty frames, where A through X represent frames 1–24, respectively of the animation sequence. Those of ordinary skill in the art will recognize that other similar schemes are possible. By having the animation sequence generator 20 repeat frame,, in such a selected pattern, the third requirement may be satisfied without the need to provide a complete frame store.

Figure 4:
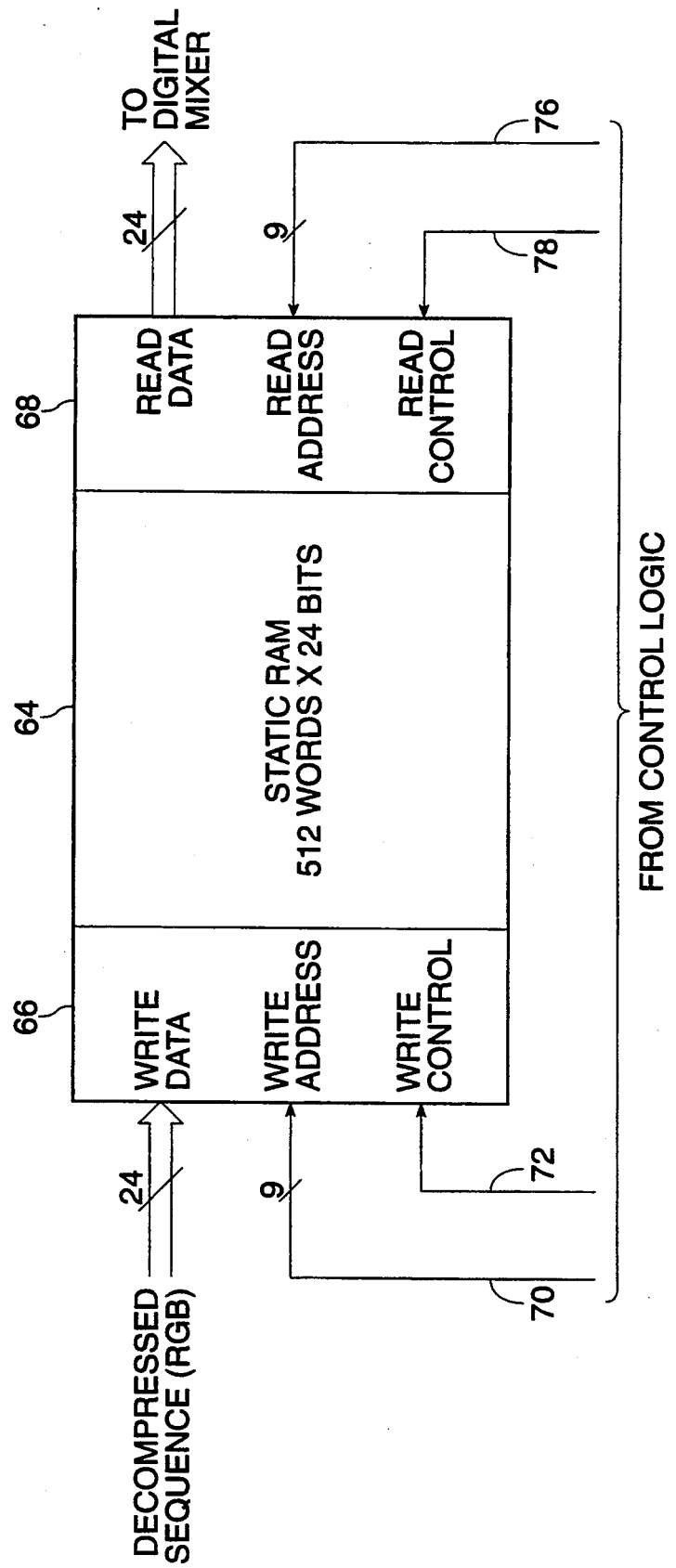
FIG. 4 is a block diagram illustrating a detailed implementation of a line store useful in the present invention.

Referring now to FIG. 4, it is seen that line store 36 can be built as a static RAM 64 with separate write port 66 and read port 68. The write port 66 is connected to the output of the animation sequence generator 20. The data on write port is 24 bits wide, and is used to store RGB pixel information from the decompressed animation sequence. The write port address bus 70 is used to select one location in the static RAM to store the next pixel information. The write port control 72 is used to enable the write operation. Both write address bus 70 and write control 72 come from the control logic 40. Control logic 40 may comprise write and write address generators (typically counters), and read and write control signal generators (typically state machines and combinatorial logic). The read and write control signals are synchronized by external signals in a conventional manner. Digital pixel information is read from the Read Port 74. The read port 74 is connected one of the inputs of the digital mixer, and conveys the 24 bit RGB pixel information. The read port address bus 76 is used to select one location in the static RAM to read the next pixel information from. The read port control 78 is used to enable the read operation. Both read address bus 76 and read control 78 come from the control logic 40. Architectures like line store 36 are well known in the art. Those of ordinary skill in the art will recognize that a first-in, first-out (FIFO) buffer is equivalent to the line store memory for the purposes of the present invention and may be substituted therefor.

Figure 5:
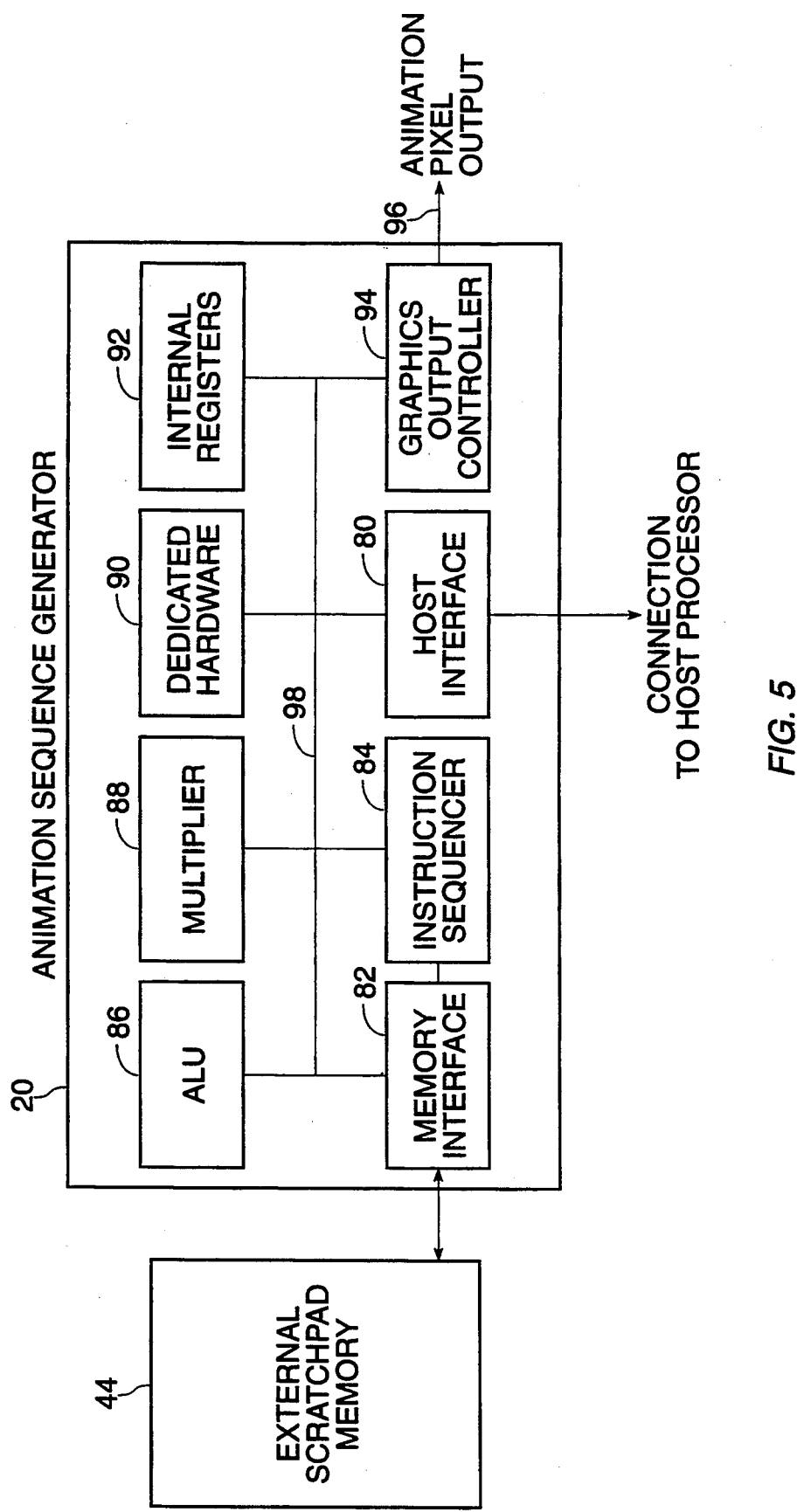
FIG. 5 is a block diagram of a presently preferred embodiment of an animation sequence generator according to the present invention.

Referring now to FIG. 5, a block diagram of a presently preferred embodiment of animation sequence generator 20 is shown. Animation sequence generator 20 communicates with the host processor via host interface 80, which may comprise address and data latches, and host bus controllers, and controls communications with the host processor in a standard manner. The host processor generally sends animation sequences in compressed form to the animation sequence generator 20 through this port. Animation sequence generator 20 communicates with scratchpad memory 44 via memory interface 82, which may comprise row-address strobe (RAS) generators, column-address strobe (CAS) generators, address multiplexers, data buffers, and a refresh controller as is well known in the art.. Memory interface 82 is used to control external scratchpad memory 44, which is generally one or several megabytes of DRAM. Scratchpad memory 44 is used to store data or instructions.

The operation of animation sequence generator 20 is directed by instruction sequencer 86, which may comprise an instruction buffer and instruction decoder commonly employed in microprocessor systems. Instruction sequencer controls the operation of a conventional ALU (arithmetic logic unit) 86, used to perform general operations such as add, subtract, logical and, logical invert, logical or, magnitude comparison, a hardwired multiplier 88, used to perform very fast multiplications needed to perform image processing operations such as those found in decompression algorithms such as the standard JPEG and MPEG algorithms. Dedicated hardware 90 is used to perform special functions such as run-length decoding (Huffmann decoding), discrete cosine transform, and bit block transfer operations. Off-the-shelf, special-purpose integrated circuits from numerous manufacturers are readily available to perform these functions. Internal registers, comprising 32 words of 32 bits each, are used to store operands upon which ALU 86, the multiplier 88 and the special hardware 90 will operate. Finally, graphics output controller 94 is used to provide an interface for the decompressed animation pixel output to line store 36 on bus 96. The elements of animation sequence generator 20 are connected together by an internal bus 98 as is well known in the art.

In a typical operating sequence, the host processor 10 reads compressed animation sequences from a storage medium (hard disk, CD-ROM, server,etc), and sends those compressed sequences to the animation sequence generator 20 through the host interface port 80. The animation sequence generator 20 temporarily stores those compressed data in the external scratchpad memory 44 which is then used as a buffer for this information. This compressed information is then read from the external scratchpad memory 44 by the animation sequence generator 20, and decompressed according to standard decompression software, such as MPEG standard digital video decompression, stored in the same external scratchpad memory 44. This software processes the compressed data to yield decompressed pixel information in the ALU 86, multiplier 88, and dedicated hardware 90 are activated by the instruction sequencer 84 in response to specific programmable instructions stored in the external scratchpad memory 44. The decompressed pixels are then delivered through the graphics output controller port 96.

Figure 6:
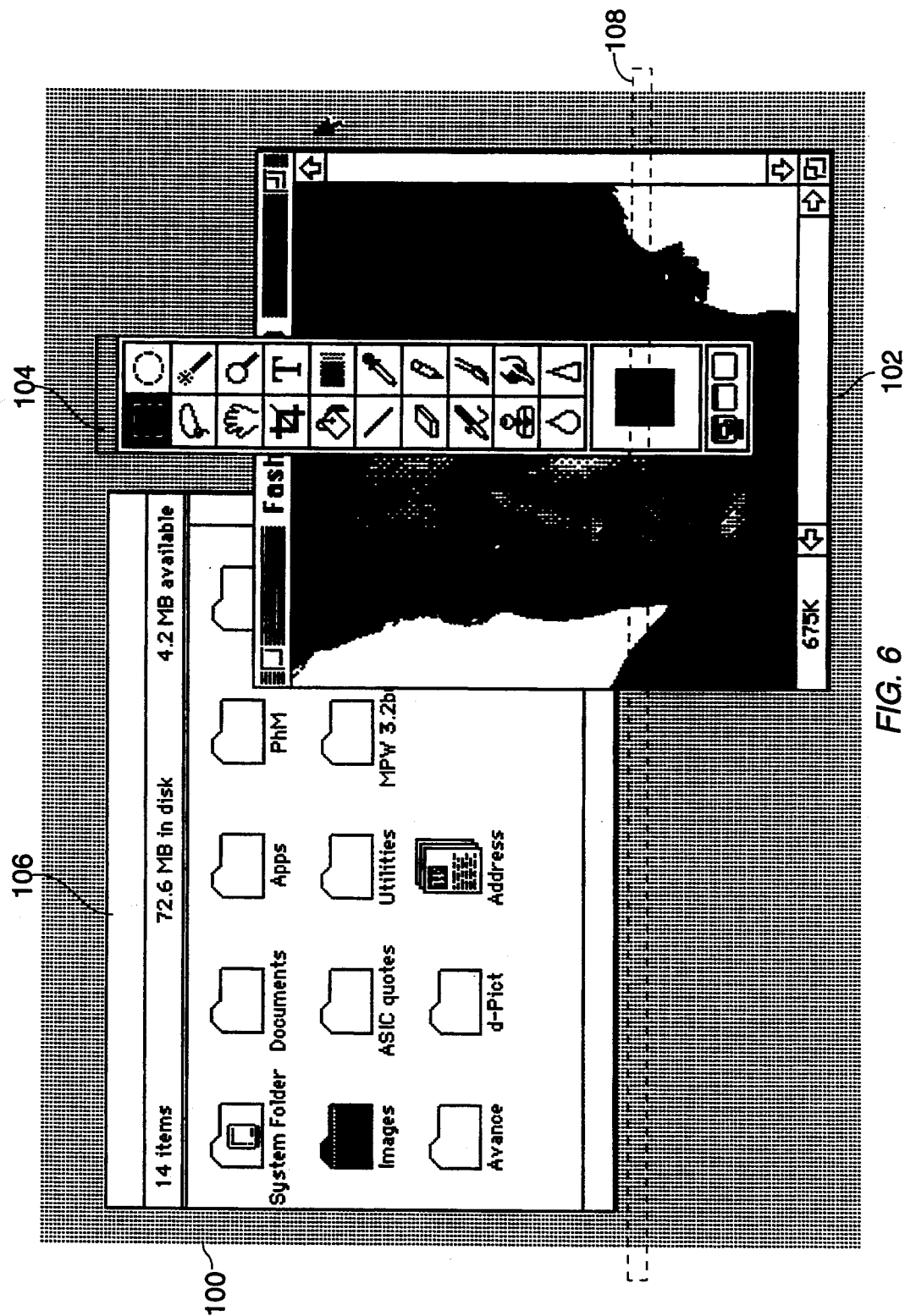
FIG. 6 is a depiction of an illustrative computer display with an animation sequence window shown thereon.

Referring now to FIG. 6, a typical computer display 100 includes several windows. A typical application is to show the animation sequence inside of a window, such as window 102. Objects can be overlaid on top of the animation sequence pixels, such as window 104, and objects, such as 106, can be underlaid behind the window 102. The overlay of computer graphics pixels and animation sequence pixels is controlled by the digital mixer 34 (FIG. 2). The digital mixer 34 can deliver to the video DAC 42 pixels from computer graphics generator 16 or from animation sequence generator 20. Pixel lines contained in area 108 of FIG. 4 will be examined in more detail.

Figure 7:
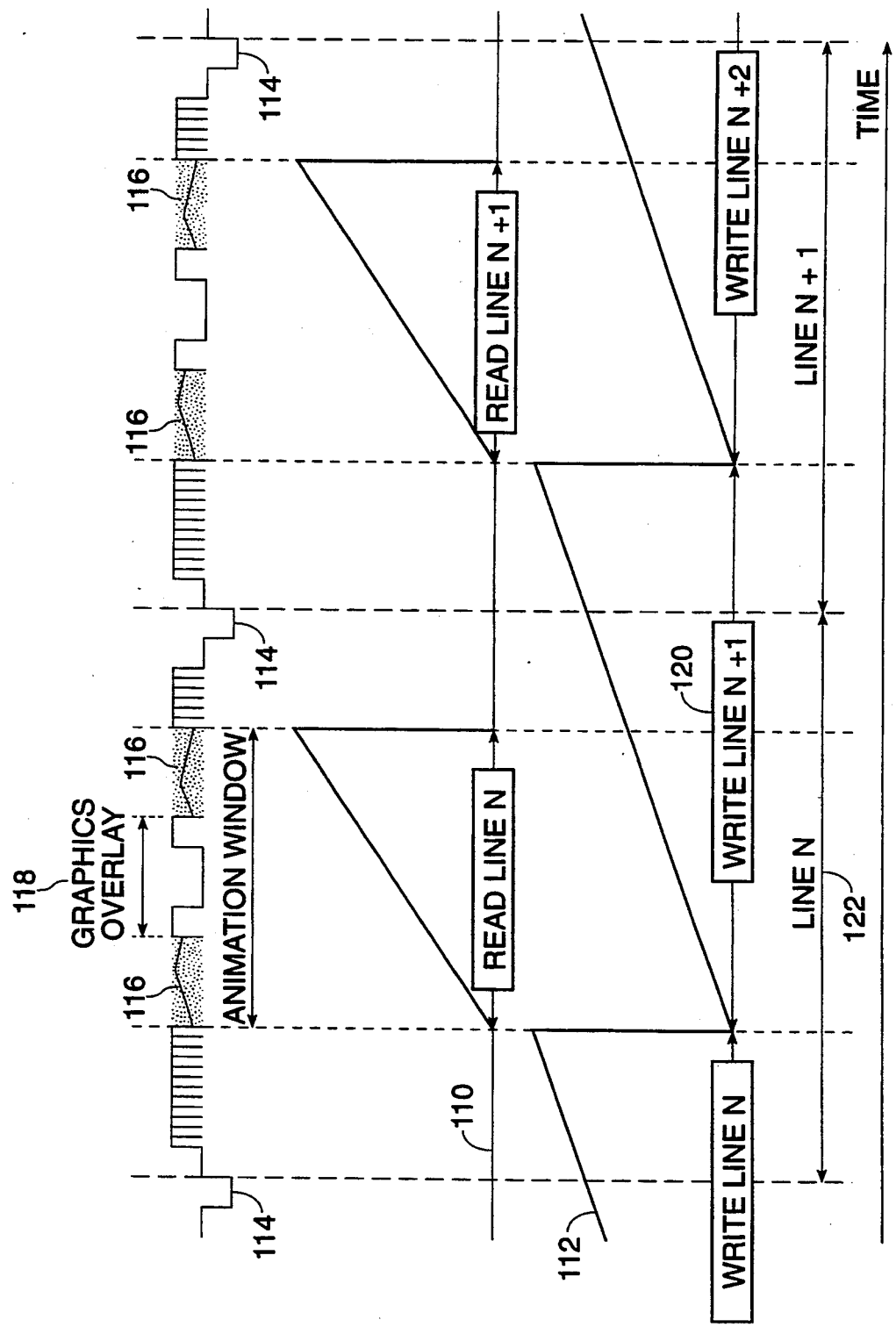
FIG. 7 is a timing diagram illustrating the relative timing of the read and write addresses for the line store, and the display line including the animation window position.

FIG. 7 is a timing diagram showing synchronization of the animation pixel and line frequencies to the computer graphics pixel and line frequencies. The upper waveform of FIG. 7 comprises the amplitude of the analog video signal which is sent to the computer monitor. The middle waveform 110 is a representation of the read addresses asserted to the line store on write-address bus 70, where the increasing slope of the line symbolically indicates incrementing addresses. The lower waveform 112 is a representation of the write addresses asserted to the line store on read-address bus 76, where the increasing slope of the line also symbolically indicates incrementing addresses. The three waveforms are aligned to one another along the horizontal axis, which is time. Two display lines are described in FIG. 7: display line N and display line N+1. Each display line begins with a horizontal sync pulse, shown at reference numeral 114.

Referring now to FIGS. 6 and 7, the waveforms of FIG. 7 illustrate the portion of the display frame illustrated at reference numeral 108 in FIG. 5. Animation sequence window 102 on the computer screen shows the animation sequence delivered by the animation sequence generator 20 of FIG. 1. This animation window appears as a portion 98 of each display line. Note that computer graphics pixels 104 are overlaid on top of the animation pixels 102 to represent the region 104 of the display frame.

As shown in waveform 110 of FIG. 7, the animation pixels are read from the line store in consecutive address locations synchronously with the computer graphics pixels. This ensures the animation pixels are delivered to the digital mixer 34 at the same frequency as the computer graphics pixels. Even though the computer graphics pixel frequency can be high (typically 50 MHz), only the line store read operation has to be performed at that high frequency. As shown in waveform 112 of FIG. 6, the animation pixels coming from the animation sequence generator 20 may be written into the line store at a much lower frequency. In essence, the animation pixels for line N+1 can be written into the line store as soon as animation pixels for line N are being read out, and the writing operation can last until the first pixel for line N+1 is to be read out. The writing time interval (reference numeral 122) is equal to the display line time interval.

If Pa is the number of animation pixels to be displayed per line, and Fh is the display line frequency; then the animation pixels have to be written into the line store at a frequency $$Fa = Pa * Fh.$$

Typically: Pa=340 pixels, Fh=35 kHz, and then Fa=340*35=11.9 MHz. Those of ordinary skill in the art will appreciate the difference between the write frequency (11.9 MHz) and the read frequency (50 MHz). The write frequency is in general much lower than the read frequency. As those of ordinary skill in the art will appreciate, the animation sequence generator 20 can operate at a lower frequency than the computer graphics pixel frequency, and the single line store 36 can resynchronize both pixel and line frequencies.

Figure 8A:
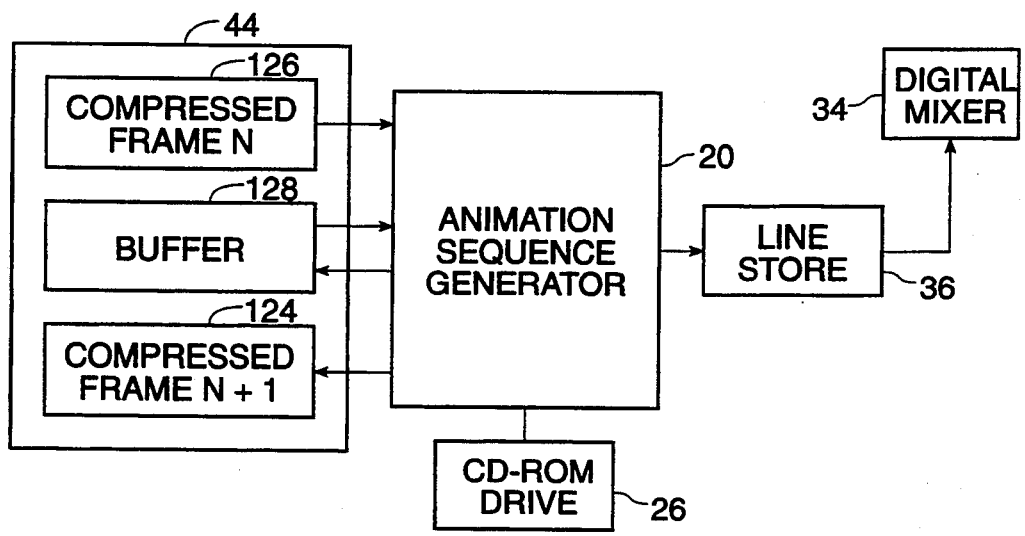
FIG. 8a is a block diagram illustrating the loading of animation frames into the scratchpad memory through the animation sequence generator
Figure 8B:
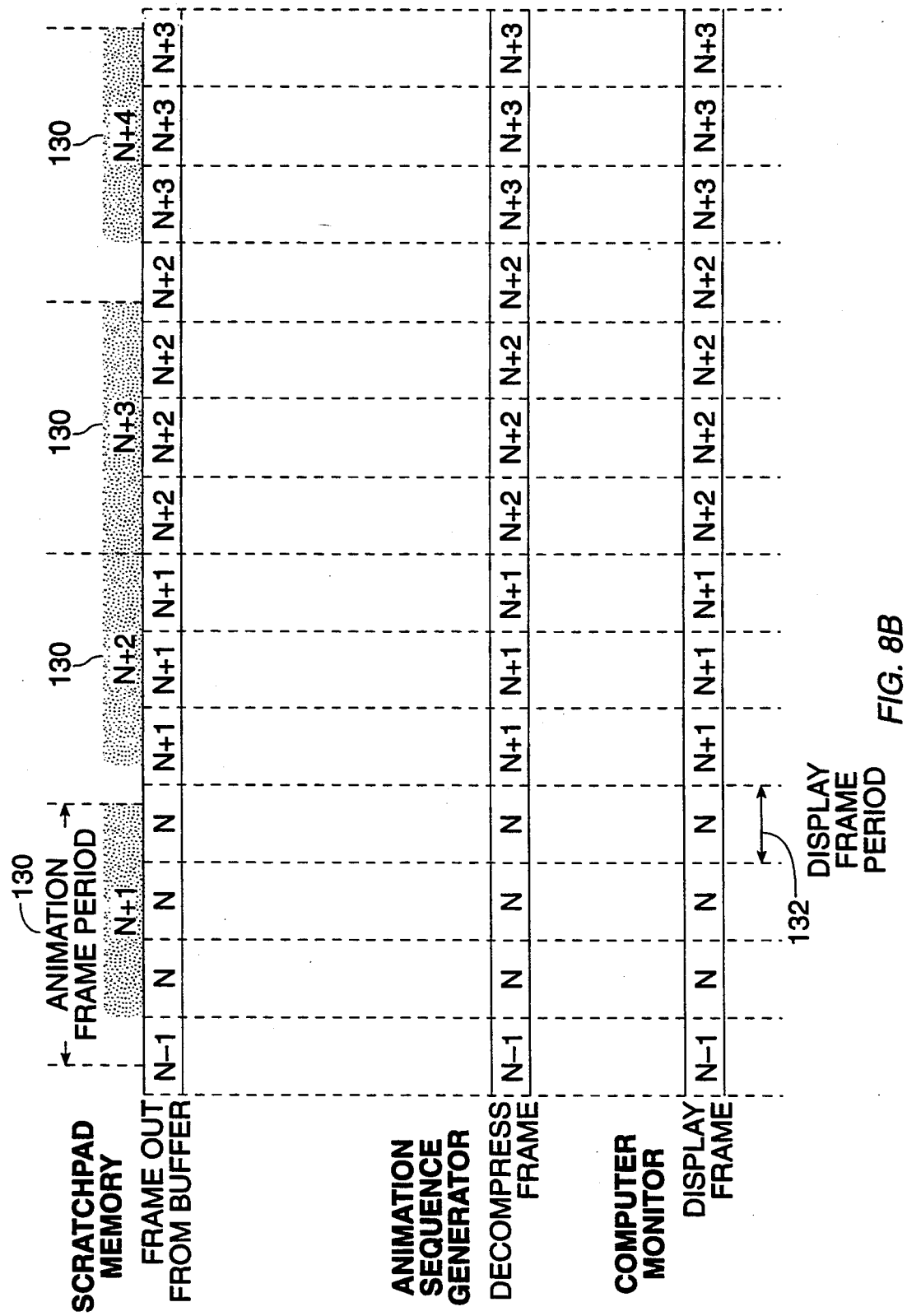
FIG. 8b is a diagram showing the relative timing of the scratchpad memory data, the animation sequence generator and line store data, and the display on the computer monitor.

FIGS. 8a and 8b illustrate how the animation sequence frame rate may be synchronized to the computer graphics frame rate. Referring first to FIG. 8a, a block diagram of a portion of the apparatus of FIG. 2, the animation sequence generator 20 receives compressed information from the CD-ROM 26 and stores that information in the scratchpad memory 44. While the compressed frame N+1 is being stored in a buffer 124 of scratchpad memory 44, the compressed information for frame N is read out multiple times from the a buffer 126 storing compressed frame N to be decompressed by the animation sequence generator 20 and sent to the line store 36. The decompressed animation pixel information is stored in buffer area 128 for delivery to line store 36 in due course.

FIG. 8b is a graphic representation explaining the timing relationship between the animation frames and the computer graphics frames. FIG. 8b illustrates the timing relationships between the pixel information in the CD ROM drive 26 and the various buffers in scratchpad memory 44.

As shown in the top line of FIG. 8b from left to right, compressed information from frames (N+1), (N+2), and (N+3) are obtained from CD ROM drive 26 and are stored in the scratchpad memory 44. This occurs during the animation frame periods 130 (illustrated between the vertical lines; typically every 1/30 of a second). As will be understood by those of ordinary skill in the art and as may be seen in FIG. 8b, these data transfers may be performed in burst modes as time permits. The computer graphics display frame periods 132 is generally much faster, typically 1/70 of a second.

While compressed frame (N+1) is being stored in buffer 124 in scratchpad memory 44 during the first animation frame period illustrated in FIG. 8b, compressed frame (N) is read for decompression from buffer 126 to animation sequence generator 20 at the computer graphics frame rate 132. Because the computer graphics frame rate 132 is in general much shorter than the animation frame rate 130, the same compressed frame (N) is repeatedly read out to the animation sequence generator 20 which in turn decompresses the same frame multiple times and stored in buffer area 128, from which it is fetched, one line at a time, for delivery to line store 36. As previously mentioned, any frame may be displayed several times to synchronize the graphics and animation information. As illustrated in FIG. 8b, frame (N) is displayed 3 times, frame (N+1) is displayed 3 times, frame (N+2) is displayed 4 times, and so on. At the start of a new animation frame period, frame (N+1) is available in buffer 124 of the scratchpad memory. At the same time, decompressed frame (N) is being read out of buffer 128 to the animation sequence generator 20 to be decompressed and displayed. The next frame to be displayed is then (N+1), and the scratchpad memory starts buffering frame (N+2) from CD ROM 26.

This adaptive repetition of compressed animation frames converts the animation frame rate to the computer graphics frame rate, and therefore performs the required synchronization between the animation frame rate and the computer graphics frame rate.

When several sequences are simultaneously presented on the computer screen, the total number of visible pixels from all animation sequences must of course be less the total resolution of the computer screen: this means the animation sequence generator 20 never has to deliver more pixels per frame than can be displayed on the computer screen; therefore the animation sequence generator 20 can be shared in time between all the displayed animation sequences.

Figure 9:
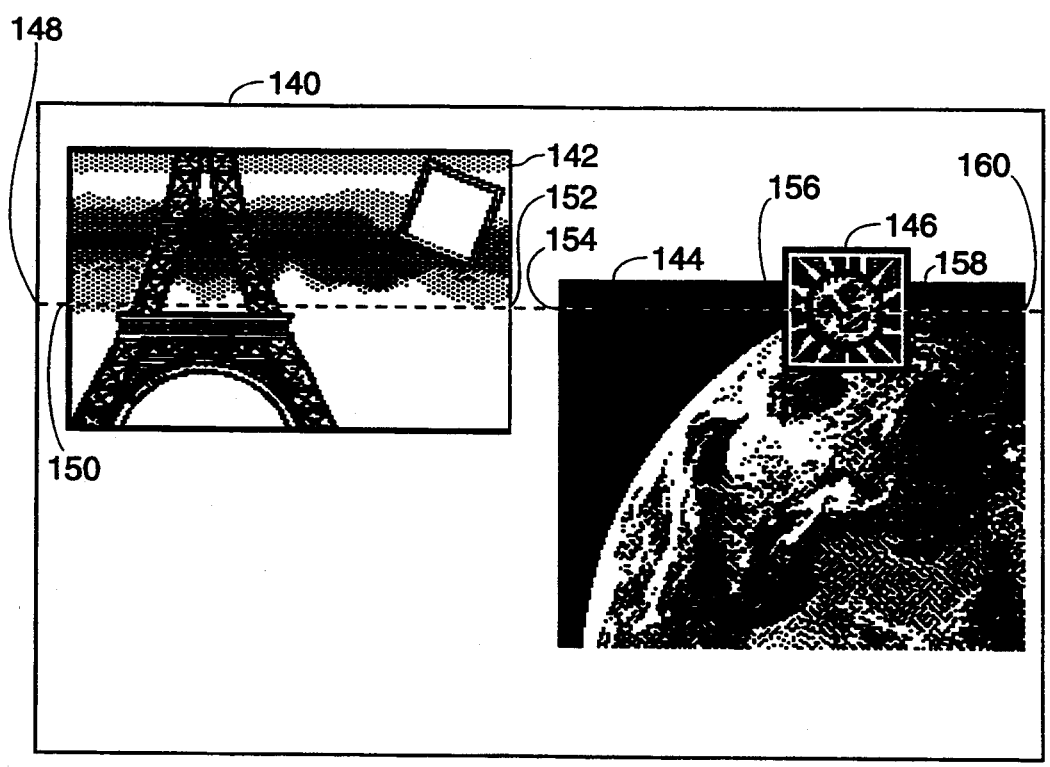
FIG. 9 is a representation of the contents of a screen during a single frame wherein multiple animation windows are displayed.

FIG. 9 is a representation of the contents of a screen 140 during a single frame wherein multiple animation windows are displayed. Three animation sequences 142, 144, and 146 are displayed simultaneously, each in its own window. Note that window 144 overlaps window 142. A scan line 146 comprises all three animation windows, as well as the computer graphics information. Scan line begins displaying graphics information at point 148. At point 150 it is seen to intersect first animation window 142, and then later at point 152 again comprises graphics information. At point 154 it first intersects second animation window 144 and then third animation window 146 at point 156, which overlaps the second animation window 144. It enters second animation window 144 again at point 158, and the graphics background again at point 160.

The animation sequence generator 20 stores in its scratchpad memory one compressed frame per animation sequence. At point 150, the animation sequence generator 20 decompresses the frame for first animation window 142; at point 154, the animation sequence generator 20 decompresses the frame for second animation window 144; at point 156, it decompresses the frame for third animation window 146, and resumes decompressing the frame for second animation window 144 at point 158. The animation sequence generator 20 has to decompress and assemble in the line store the pixels for all three animation sequences in the proper order and with proper overlay, during the duration of one computer screen scan line. Note again that because the maximum number of animation pixels from all animation sequences, visible in one scan line cannot be more than the scan line resolution, the animation sequence generator 20 can share its processing cycle between the animation sequences. However, because switching from decompressing one sequence to decompressing another sequence takes some time, the total number of pixels the animation sequence generator 20 can decompress per line is less when several sequences are visible, than when only one sequence is visible.

Given:
Th the duration of a computer screen scan line;
Pa the total number of animation pixels displayed in that line;
t the time required to decompress one pixel of a given sequence;
Ttrans the time required by the animation sequence generator 20 to change from decompressing one animation sequence to decompressing another animation sequence; then the maximum number n of different animation sequences that the animation sequence generator 20 can deliver per line is such that:

$$t*Pa + n*Ttrans < Th$$

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a computer system including a computer graphics generator producing pixels at a first selected frequency to compose lines at a second selected frequency to compose frames at a third selected frequency, said computer system further including a digital mixer for mixing, windowing, and overlaying computer graphics images and animation sequence images on a pixel-by-pixel basis for delivery to a visual display, apparatus for presenting animation information comprising pixels, lines, and frames from said animation sequence images at said first, second, and third selected frequencies in synchronization with pixels, lines, and frames from said computer graphics generator, said apparatus comprising:

first storage means for storing said animation information as compressed animation information;
means for retrieving and for temporarily storing said compressed animation in blocks comprising a selected number of frames of said compressed animation information;
means for decompressing and for temporarily storing amounts of said animation information comprising a selected number of pixels from a selected number of lines from a selected frame in a selected one of said blocks containing said compressed information, said selected frame being selected a number of consecutive times so as to synchronize with frames from said computer graphics generator at said selected third frequency; and
means for storing and presenting pixels from a selected number of lines of said amounts of said animation information to said mixer, said means for storing and presenting pixels operating to supply said pixels at first said selected frequency, and said lines at second said selected frequency in synchronization with pixels and lines from said computer graphics generator, said means for storing and presenting pixels comprising storage for fewer lines than comprise a frame of said information.

2. The apparatus of claim 1 wherein said means for storing and presenting pixels from a single line of said information comprises storage for a single line of pixels from said information.

3. The apparatus of claim 1 wherein said means for storing and presenting pixels from a single line of said information comprises a single line dual ported memory with separate read and write addressing circuits.

4. The apparatus of claim 1 wherein said first storage means comprises a compact disk drive.

5. The apparatus of claim 1 wherein said animation sequences comprise computer generated video images.

6. The apparatus of claim 1 wherein said animation sequences comprise realtime video images.

7. In a computer system including a computer graphics generator producing pixels at a first selected frequency to compose lines at a second selected frequency to compose frames at a third selected frequency, said computer system further including a digital mixer for mixing, windowing, and overlaying computer graphics images and animation sequence images on a pixel-by-pixel basis for delivery to a visual display, apparatus for presenting animation information comprising pixels, lines, and frames from said animation sequence images from more than one animation sequence at said first, second, and third selected frequencies in synchronization with pixels, lines, and frames from said computer graphics generator, said apparatus comprising:

first storage means for storing said animation information from said more than one animation sequence as compressed animation information;

means for retrieving and for temporarily storing said compressed animation from said more than one animation sequence in blocks comprising a selected number of frames of said compressed animation information;

single means for decompressing and for temporarily storing amounts of said animation information comprising a selected number of pixels from a selected number of lines from a selected frame of each of said more than one animation sequences in a selected one of said blocks containing said compressed information, said selected frame being selected a number of consecutive times so as to synchronize with frames from said computer graphics generator at said selected third frequency; and single means for storing and presenting pixels from a selected number of lines of said amounts of said animation information to said mixer, said means for storing and presenting pixels operating to supply said pixels at first said selected frequency, and said lines at second said selected frequency in synchronization with pixels and lines from said computer graphics generator, said means for storing and presenting pixels comprising storage for fewer lines than comprise a frame of said information.

8. The apparatus of claim 7 wherein said single means for storing and presenting pixels from a single line of said information comprises storage for a single line of pixels from said information.

9. The apparatus of claim 7 wherein said single means for storing and presenting pixels from a single line of said information comprises a single line dual ported memory with separate read and write addressing circuits.

10. The apparatus of claim 7 wherein said first storage means comprises a compact disk drive.

11. The apparatus of claim 7 wherein said animation sequences comprise computer generated video images.

12. The apparatus of claim 7 wherein said animation sequences comprise realtime video images.

13. A computer system for displaying animation sequences and graphics on a visual display as a set of pixels comprising a set of lines comprising a set of frames, said system comprising an animation sequence generator, said animation sequence generator comprising an animation input port for accepting animation information as a set of blocks having a set of frames of said animation information;

a memory coupled to said animation sequence generator, said memory comprising less storage than for an entire frame of pixels;

a graphics generator, said graphics generator comprising a graphics output port for presenting pixels at a first selected frequency, lines at a second selected frequency, and frames at a third selected frequency;

a memory control element coupled to said memory, said memory control element comprising a read address port, a read control line, a write address port, and a write control line, said memory control element operating to read sequences of pixels from said memory at said first selected frequency, to read sequences of lines from said memory at said second selected frequency, and to write frames of said animation information to said memory at said third selected frequency;

a digital mixer coupled to said memory and to said graphics generator, said digital mixer comprising a mixer output port for presenting pixels, lines and frames in an output format suitable for visual display.

14. A computer system as in claim 13, wherein said animation sequence generator comprises an animation memory for storing compressed animation information;

a processor for decompressing said compressed animation information and generating animation sequences having a set of frames of animation information; and an animation output port for producing a selected sequence of said frames, said selected sequence comprising a set of frames having been selected a plurality of times to synchronize with frames from said graphics generator.

15. A computer system as in claim 13, comprising an extended memory coupled to said animation sequence generator, said memory and said extended memory collectively comprising storage for a plurality of lines of pixels, said plurality of lines being less storage than an entire field; and a temporal filter coupled to said memory and said extended memory.

16. A computer system as in claim 13, wherein said digital mixer comprises a multiplexer coupled to said memory, to said graphics output port, and to said animation input port;

a control circuit coupled to said multiplexer, said control circuit coupled to said graphics output port and to at least one register, said control circuit disposed to generate a control signal which is a Boolean function of a content value of said at least one register and of a value presented by said graphics output port.

17. A computer system as in claim 16, wherein said control circuit comprises a chromakey register.

18. A computer system as in claim 16, wherein said control circuit is coupled to said mixer output port.

* * * * *

UNITED STATES PATENT AND TRADEMARK OFFICE
CERTIFICATE OF CORRECTION

PATENT NO. : 5,404,437
DATED : April 4, 1995
INVENTOR(S) : Julien T. Nguyen

It is certified that error appears in the above-indentified patent and that said Letters Patent is hereby corrected as shown below:

Column 5, line 41, replace "frame,," with --frames --.

Column 8, line 5, replace "11.9 - MHz" with --11.9 MHz--.

Signed and Sealed this

Fourteenth Day of May, 1996

Attest:

BRUCE LEHMAN

Attesting Officer     Commissioner of Patents and Trademarks